(12) United States Patent (10) Patent No.: US 8,565,587 B2
Asanuma et al. (45) Date of Patent: Oct. 22, 2013

(54) RECORDING CONTROL APPARATUS AND METHOD FOR CONTROLLING RECORDING CONTROL APPARATUS

(75) Inventors: Tomoya Asanuma, Yokohama (JP); Teruki Kikkawa, Machida (JP); Tomoyasu Yoshikawa, Kawasaki (JP); Satoshi Hanamitsu, Kawasaki (JP); Osamu Yonishi, Yokohama (JP); Yasushi Shikata, Tama (JP); Koji Mito, Kawasaki (JP); Katsuhiro Miyamoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1314 days.

(21) Appl. No.: 12/043,887

(22) Filed: Mar. 6, 2008

(65) Prior Publication Data

US 2008/0226257 A1 Sep. 18, 2008

(30) Foreign Application Priority Data

Mar. 16, 2007 (JP) ................................. 2007-068790

(51) Int. Cl.
*H04N 5/91* (2006.01)
(52) U.S. Cl.
USPC ......................................................... 386/292
(58) Field of Classification Search
USPC .......................................................... 386/292
See application file for complete search history.

(56) References Cited

U.S. PATENT DOCUMENTS

| 5,477,279 A | 12/1995 | Chang | |
|---|---|---|---|
| 2005/0160221 A1* | 7/2005 | Yamazaki et al. | 711/114 |
| 2005/0276567 A1* | 12/2005 | Okuyama et al. | 386/46 |
| 2007/0201836 A1* | 8/2007 | Tsubota et al. | 386/96 |
| 2007/0242304 A1* | 10/2007 | Asano | 358/1.16 |
| 2009/0092011 A1* | 4/2009 | Matsushita et al. | 369/47.5 |

FOREIGN PATENT DOCUMENTS

| CN | 1505392 A | 6/2004 |
|---|---|---|
| JP | 11-331714 A | 11/1999 |
| JP | 2006-50315 A | 2/2006 |
| WO | 2006/126372 A | 11/2006 |
| WO | WO 2006126372 A1 * | 11/2006 |

* cited by examiner

*Primary Examiner* — Michael S McNally
(74) *Attorney, Agent, or Firm* — Canon U.S.A., Inc., IP Division

(57) ABSTRACT

A recording control apparatus is connected to and in communication with a recording apparatus capable of recording a broadcasting video image on a storage unit and has two or more operating state levels that differ in power consumption. The recording control apparatus includes an acquisition unit configured to acquire program information about a program currently being viewed, a determination unit configured to determine a user's recording tendency level as to a program currently being viewed based on the program information acquired by the acquisition unit, and a control unit configured to issue a command to control the operating state level of the recording apparatus based on the recording tendency level determined by the determination unit.

24 Claims, 9 Drawing Sheets

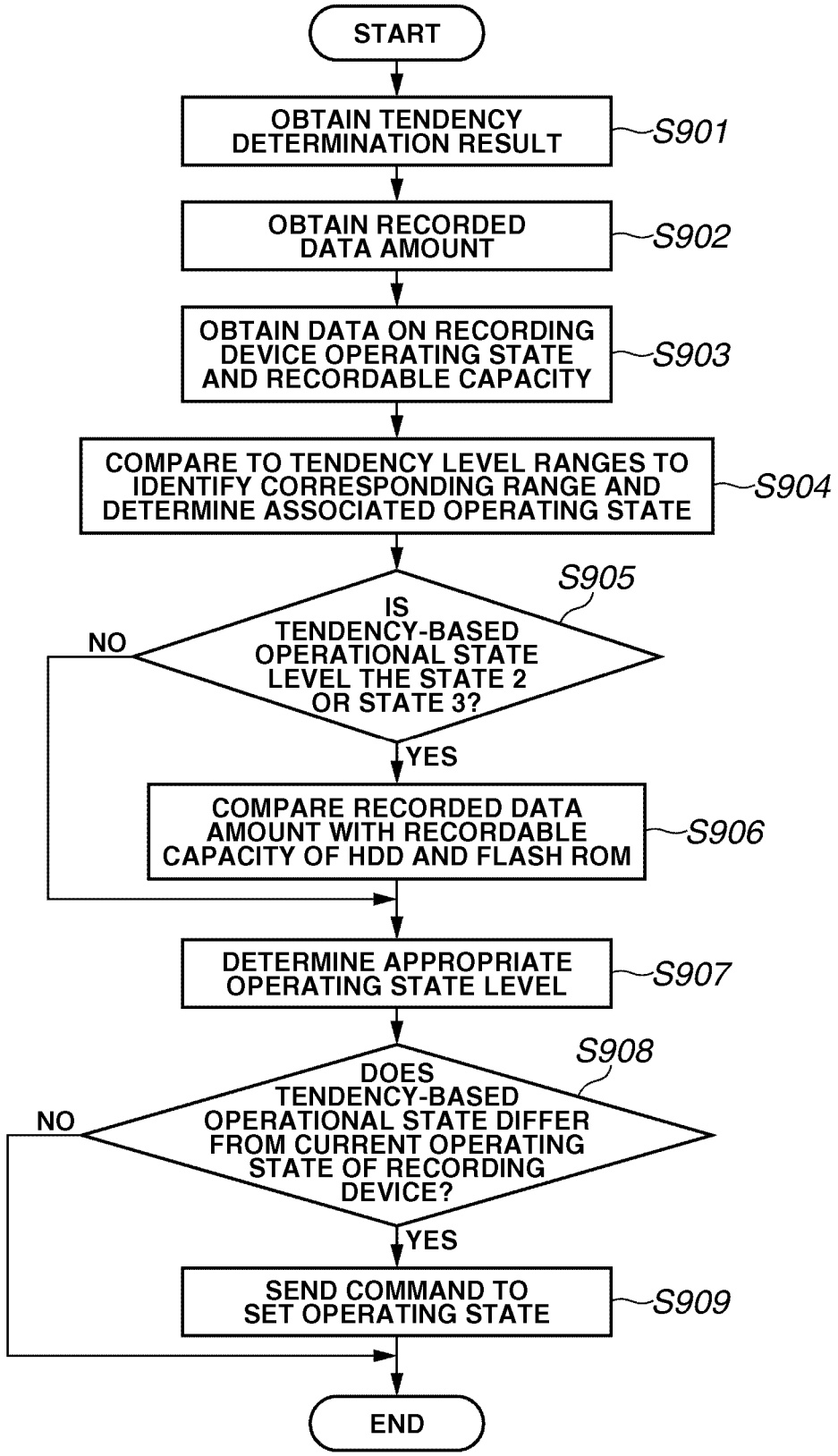

RECORDING CONTROL APPARATUS AND METHOD FOR CONTROLLING RECORDING CONTROL APPARATUS

CROSS-REFERENCE TO RELATED APPLICATIONS

This application claims priority from Japanese Patent Application No. 2007-068790 filed Mar. 16, 2007, which is hereby incorporated by reference herein in its entirety.

BACKGROUND OF THE INVENTION

1. Field of the Invention

The present invention relates to a recording control apparatus configured to control a recording operation of a recording apparatus capable of recording received video data, and a method for controlling the recording control apparatus.

2. Description of the Related Art

In recent years, video systems connecting a recording apparatus such as a hard disk drive (HDD) recorder and a television have enabled control to record video data of a program in the HDD recorder by sending an instruction for recording from the television side. If a user viewing the television program wants to record the program, such a video system can readily record the program in an HDD recorder without requiring a user's direct operation of the HDD recorder. Such a recording function is hereinafter referred to as "immediate recording function".

As described above, a process of sending a recording instruction to the HDD recorder has been facilitated, however, the HDD recorder cannot necessarily start recording just at a user's desired timing. This is mainly because the HDD recorder requires certain time to start operating. In the case of starting the HDD recorder from a power-off state to a recordable state, it usually requires several tens of seconds. This results in a problem that a recording starting time delays, and a desired scene may be missed.

In order to solve the problem, Japanese Patent Application Laid-Open No. 2006-50315 discusses a data recording and play-back apparatus that automatically records a program that a user regularly views. This data recording and play-back apparatus specifies a program that a user regularly views and, if the user does not view the program at that broadcast time, executes control to automatically record the program. The method for automatically recording a program further includes a technique by which, if the power is in an off-state when the program is to be recorded, the power of the data recording and play-back apparatus is switched on.

In order to cut off the starting time of the HDD recorder, there is another technique in which, instead of switching the power completely off, the HDD recorder is kept in a standby state during which the HDD recorder can be swiftly switched to a recordable state. In this standby state, many systems of the HDD recorder are kept energized, and thus, the power consumption during the standby state is higher than that during a power-off state.

The technique discussed in Japanese Patent Application Laid-Open No. 2006-50315 identifies a program that a user regularly views and automatically records the program. However, the identified program might not match the user's preference or desire. For example, the technique discussed in Japanese Patent Application Laid-Open No. 2006-50315 automatically records even a program that a user regularly viewed in the past but does not view any more. In addition, the technique does not address the case where the recorder records a program currently being broadcast immediately in response to a user's instruction.

Thus, the recorder may automatically record a program that a user does not intend to record. As a result, the data recording and play-back apparatus wastes power. Further, such recording may occupy lots of recording capacity of the data recording and play-back apparatus.

From the viewpoint of solving the above problems, immediate recording by a user's manual operation is preferable. However, if the HDD recorder is kept operating in a recordable state so as to record a program just at a desired timing, while undesired programs are not recorded, power consumption barely decreases.

SUMMARY OF THE INVENTION

The present invention is directed to a recording control apparatus that provides a recording apparatus operating state that reduces power consumption while allowing recording to start rapidly. Based on a user's recording tendency level, (a tendency to record a program at the time of viewing the program), the control apparatus and recording apparatus operating state shorten a recording start time in immediate recording relative to starting from a power off state and reduces power consumption of the recording apparatus relative to a continuous power on state. The present invention is also directed to a method for controlling the recording control apparatus.

According to an aspect of the present invention, a recording control apparatus is connected to and in communication with a recording apparatus capable of recording a broadcasting video image in a storage unit. The recording apparatus has two or more operating state levels that differ in power consumption. The recording control apparatus includes an acquisition unit configured to acquire program information about a program currently being viewed, a determination unit configured to determine a user's recording tendency level as to a program currently being viewed based on the program information acquired by the acquisition unit, and a control unit configured to issue a command to control an operating state level of the recording apparatus based on the recording tendency level determined by the determination unit.

According to another aspect of the present invention, a method for controlling a recording control apparatus connected to and in communication with a recording apparatus capable of recording a broadcasting video image in a storage unit is provided. According to the aspect, the recording apparatus has two or more operating state levels that differ in power consumption. The method includes acquiring program information about a program currently being viewed, determining a user's recording tendency level as to a program currently being viewed based on the acquired program information, and issuing a command to control an operating state level of the recording apparatus based on the determined recording tendency level.

According to yet another aspect of the present invention, a recording control system includes a recording apparatus capable of recording a broadcast video image in a storage unit. The recording apparatus has two or more operating state levels that differ in power consumption. A recording control apparatus is connected to and in communication with the recording apparatus. The recording control apparatus includes an acquisition unit configured to acquire program information about a program currently being viewed, a determination unit configured to determine a user's recording tendency level as to a program currently being viewed based on the program information acquired by the acquisition unit, and a control unit configured to issue a command to control an operating state level of the recording apparatus based on the recording tendency level determined by the determination unit. The recording apparatus includes a receiving unit configured to receive the command and a change unit configured to execute control to set an operating state level of the recording apparatus to be the designated operating state level.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a flowchart of an operating state level control processing of a recording apparatus according to the second exemplary embodiment of the present invention.

DETAILED DESCRIPTION OF THE EMBODIMENTS

Various exemplary embodiments, features, and aspects of the invention are described in detail below with reference to the drawings.

First Exemplary Embodiment

Figure 1:
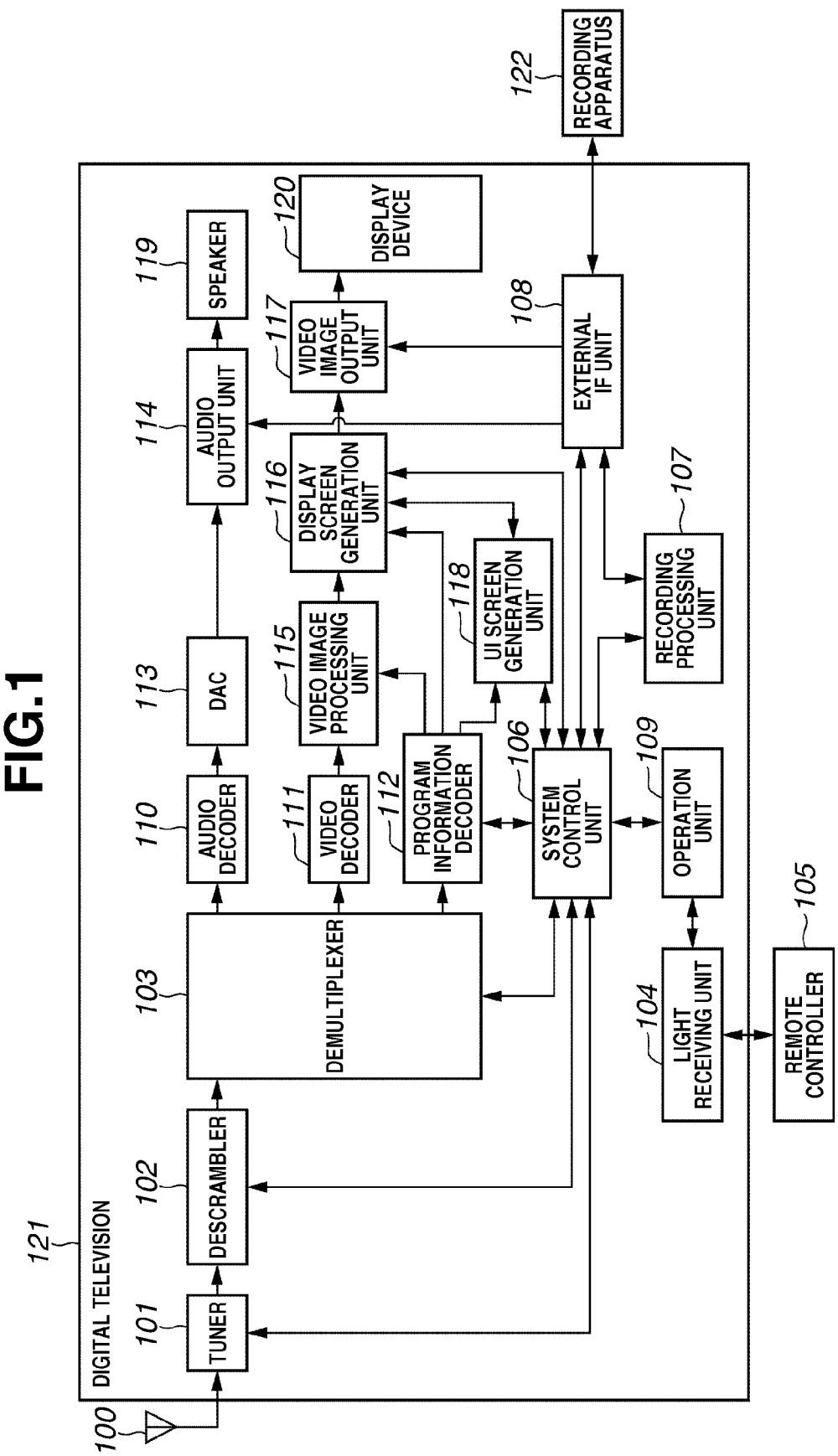
FIG. 1 is a system diagram of a digital television according to an exemplary embodiment of the present invention.

FIG. 1 is a system diagram of a recording control system including a digital television according to an exemplary embodiment of the present invention. The configuration of a digital television 121 as a recording control apparatus is described first. In this exemplary embodiment, a digital television is used as the recording control apparatus, but the recording control apparatus of the present invention is not limited to embodiments incorporated in a the digital television.

First, an external antenna 100 receives a broadcast signal, and the received signal is input to a tuner 101 of a digital television 121 through an antenna cable. The tuner 101 performs demodulation and error correction on the input signals to generate transport stream data (hereinafter referred to as "TS"). Further, the tuner outputs the generated TS to a descrambler 102.

The descrambler 102 descrambles a TS scrambled and transmitted, for example, on pay-TV, and outputs the unscrambled TS to a demultiplexor 103. If unscrambled or non-scrambled TS is received by the tuner 101, the descrambler 102 outputs the TS directly to a demultiplexer 103.

The demultiplexer 103 extracts a desired stream from the TS including plural multiplexed video and audio streams. In general, the TS include video data, audio data, and program information for a plurality of channels, which are multiplexed in a time-division manner. The video data and the audio data are packetized and compression-coded data called "packetized elementary stream (PES)". Thus, the descrambler 102 extracts, from the TS, a video PES and an audio PES of a program selected by a user. The program information data is section-based data. Therefore, the video PES, the audio PES, and the program information section data extracted by the demultiplexer 103 are output to a video decoder 111, an audio decoder 110, and a program information decoder 112, respectively.

The user can select a program by operating a remote controller 105 that sends a program to a light receiving unit 104. The light receiving unit 104 receives the program sent from a remote controller 105 and transmits a corresponding signal through an operation unit 109 to a system control unit 106. Needless to say, the user can alternatively operate the operation unit 109 directly without using the remote controller 105, or alternatively the system control unit 106 may automatically select a program based on predetermined information.

The TS of this exemplary embodiment can be divided into packets, and a packet identifier (PID) for identifying a data type (video or audio) is added to a header of each packet.

The video decoder 111 decodes a video PES. The video PES output from the demultiplexer 103 is encoded in an MPEG format or the like. Then, the video decoder 111 decodes the video PES output from the demultiplexer 103 and outputs the decoded video data to a video image processing unit 115.

The audio decoder 110 decodes an audio PES. An audio PES output from the demultiplexer 103 is encoded in an MPEG format or the like similar to the video PES. Then, the audio decoder 110 decodes the audio PES and outputs the decoded audio data to a digital analog converter (DAC) 113.

The DAC 113 performs digital/analog (D/A) conversion on the audio data into an analog audio signal and outputs the analog audio signal to an audio output unit 114. The audio output unit 114 outputs an analog audio signal to a speaker 119 or the like.

The program information decoder 112 decodes program information section data to obtain desired information and outputs the information to a display screen generating unit 116, a user interface (UI) screen generating unit 118, and a video image processing unit 115. The program information data mainly includes data of a service description table (SDT), an event information table (EIT), and a time offset table (TOT) conforming to "Service Information for Digital Broadcasting System" prescribed by the Association of Radio Industries and Businesses (ARIB), the organization that sets broadcast regulations in Japan.

The SDT includes information about a service name or a service provider of a broadcasting channel. The EIT includes information about an event name and a start time and airtime of an event. The TOT includes information about current date and time. The video image processing unit 115 executes video image adjusting processing based on the video data input from the video decoder 111 and the program information input from the program information decoder 112. The video image processing unit 115 outputs the adjusted video data to the display screen generating unit 116.

The UI screen generating unit 118 generates UI screen data such as an electronic program guide (EPG) based on the program information data input from the program information decoder 112. The UI screen generating unit 118 outputs the generated UI screen data to the display screen generating unit 116.

The display screen generating unit 116 switches or combines video data and UI screen data input from the video image processing unit 115 and the UI screen generating unit 118 respectively according to instructions entered with the remote controller 105 or the like. The display screen generating unit 116 and outputs the resultant data to the video image output unit 117.

The video image output unit 117 converts the received data into display data in a format suitable for a display resolution, the number of display colors, and a refresh rate of a display device 120, and outputs video data or UI screen data to the display device 120 at predetermined timing. The system control unit 106 is connected to the tuner 101, descrambler 102, demultiplexor 103, operation unit 109, recording processing unit 107, external IF unit 108, program information decoder 112, display screen generation unit 116, and UI screen generation unit 118 and using such connections has control over every component of the digital television 121.

Further, the system control unit 106 is connected to the recording processing unit 107. The recording processing unit 107 has a function of sending a command to record (or perform programming to record) to the external IF unit 108 so as to record a program currently being broadcast with a connected recording apparatus 122 or perform programming with the EPG generated by the display screen generating unit 116. The recording processing is described below in detail.

The external IF unit 108 provides an interface function that enables data communications between the system control unit 106 or the recording processing unit 107 and the recording apparatus 122 based on a predetermined communication system. Further, the external IF unit 108 has a function of transferring video data or audio data input from the recording apparatus 122 to the video image output unit 117 or the audio output unit 114 respectively.

That is the configuration of the digital television 121 according to the embodiment, although other configurations also conform to the present invention. The digital television 121 of the present exemplary embodiment is integrated with the display device 120 and the speaker 119. However, the display device 120 and/or the speaker 119 may be provided independently of the digital television 121.

Figure 2:
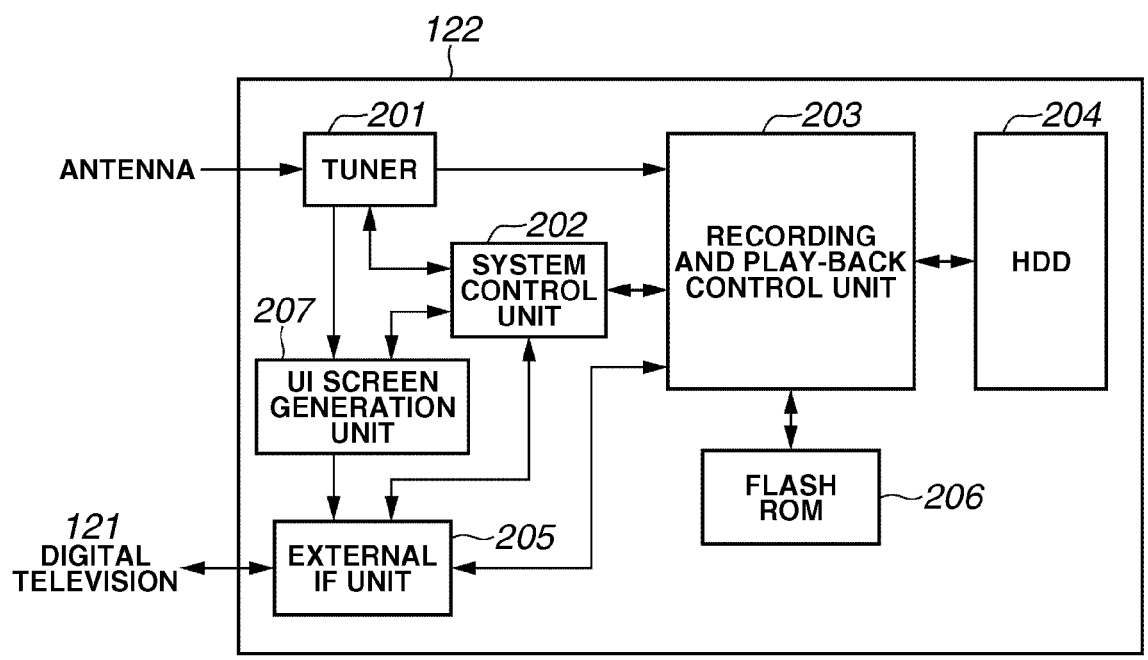
FIG. 2 is a system diagram of a recording apparatus according to an exemplary embodiment of the present invention.

Referring next to FIG. 2, the configuration of the recording apparatus 122 as a recording apparatus of the present invention is described. As illustrated in FIG. 1, the recording apparatus 122 is connected to transmit/receive various types of data to/from the external IF unit 108 of the digital television 121 based on a predetermined communication system.

The recording apparatus 122 can record video data of a program based on a broadcast signal received via an antenna (ANTENNA) through the tuner 201 and on a hard disk drive (HDD) 204. The HDD 204 is a storage unit capable of storing video data. The recording apparatus 122 includes a flash read only memory (ROM) 206 as a small storage unit. The system control unit 202 has control over components of the recording apparatus 122. Further, the system control unit 202 controls operating states as described below.

A recording and play-back control unit 203 executes control to store video data or audio data input from the tuner 201 on the HDD 204. Further, the control unit executes control to output the video data or audio data stored on the HDD 204 and output the data to the digital television 121 through the external IF unit 205.

The UI screen generating unit 207 has a function similar to a function of the UI screen generating unit 118 of the digital television 121. The UI screen generating unit 207 generates UI screen data such as electronic program guide (EPG) based on program information data input from a program information decoder (not illustrated), and outputs the generated data to the external IF unit 205.

An HDD recorder as a general recording apparatus includes many components such as a demultiplexer or various decoders in addition to the above components. In the present exemplary embodiment, however, only components related to the present invention are described. The present invention is not limited to the HDD recorder as illustrated in FIG. 2.

Figure 3:
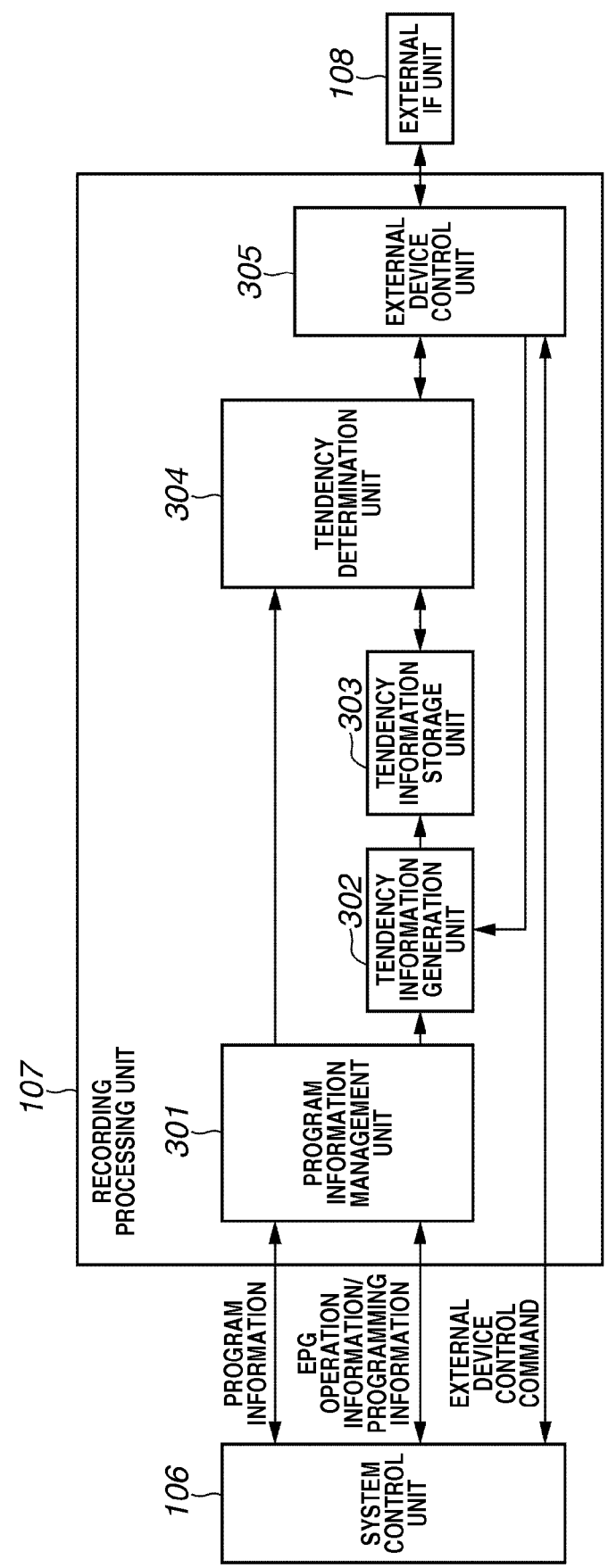
FIG. 3 is a system diagram of a recording processing unit according to a first exemplary embodiment of the present invention.

Referring next to FIG. 3, the configuration of the recording processing unit 107 of the digital television 121 and various control operations of the recording processing unit 107 are described. FIG. 3 is a functional block diagram illustrating detailed configuration of the recording processing unit 107. The recording processing unit 107 transmits/receives various types of information to/from the system control unit 106.

A recording information management unit 301 receives program information and recording information from the system control unit 106 and manages the received information. The program information corresponds to program information output from the program information decoder 112. In this example, the program information is information about a program name, performers, a category, and program guide of a program selected by the digital television 121, that is, a program that the user views.

Further, the recording information is information about a search keyword or a program category as well as program information regarding a target program that the user wants to record. Information output from the program information management unit 301 is input to the tendency information generation unit 302 and the tendency level determination unit 304. The output information is described in detail below.

The tendency information generation unit 302 executes control to generate information about the user's recording tendency. Hence, the tendency information generation unit 302 receives program information or recording information managed by the program information management unit 301. As the program information or recording information output to the tendency information generation unit 302, it is preferable to output the information regarding a program that the user wants to record.

The tendency information generation unit can grasp the user's favorite performer, title, and category of a program by utilizing these program and recording information. Further, the tendency information generation unit 302 can also receive information about the user's recording tendency from the recording apparatus 122 through the external IF unit 108 and the external device control unit 305. The user can record a program by operating the recording apparatus 122 as well as the digital television 121.

For example, the recording apparatus 122 can also collect information about the user's preference on recording or a recording history such as program information about programs recorded by the user and recording information such as a keyword set by the user for automatic recording. Accordingly, the tendency information generation unit 302 collects the program information or recording information stored in the recording apparatus 122 to generate reliable information about the user's recording tendency level.

The information about the user's recording tendency level generated by the tendency information generation unit 302 may be experience-based information such as the user's past recording history or preference information obtained by evaluating user's characteristics based on a given algorithm. Alternatively, these information may be combined to generate information about the user's recording tendency level.

Various information acquiring methods are applicable to receive the program information and recording information from the recording apparatus 122. The present invention is not limited to any particular information acquiring method.

The tendency information generation unit 302 generates a tendency information database corresponding to the user's recording tendency information based on the program information and recording information received from the system control unit 106 and recording apparatus 122. Further, the tendency information generation unit 302 outputs the generated tendency information database to the tendency information storage unit 303.

If the user's recording information or program information is received even after generating the tendency information database, the tendency information generation unit 302 carries out generation of recording tendency information using the last information to update the tendency information database.

The tendency information storage unit 303 stores the tendency information database output from the tendency information generation unit 302. The tendency level determination unit 304 determines a recording tendency level of a predetermined program currently being viewed by the user based on the program information input from the program information management unit 301 and the tendency information database stored in the tendency information storage unit 303. The tendency level determined by the tendency level determination unit 304 is a recording tendency level indicating a probability that a user will record a program currently being broadcast.

Figure 4:
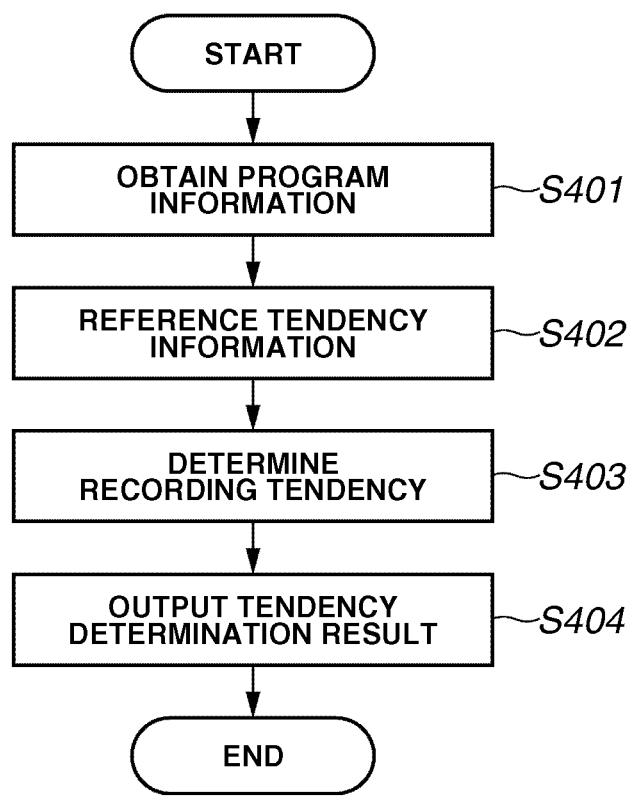
FIG. 4 is a flowchart of a tendency level determination processing according to an exemplary embodiment of the present invention.

Referring to a flowchart of FIG. 4, the determination processing of the tendency level determination unit 304 is described. First, in step S401, the tendency level determination unit 304 receives program information about a program currently being viewed by a user from the program information management unit 301 in order to determine the user's recording tendency level. The program information is information about a program name, a performer, or a category included in the EIT.

Next, in step S402, the tendency level determination unit 304 references the tendency information database stored in the tendency information storage unit 303. Subsequently, in step S403, the tendency level determination unit 304 determines a recording tendency level of a program currently being viewed by a user based on the program information obtained in step S401 and the tendency information database referenced in step S402. The tendency level determination processing in step S403 determines how much a program as a target of tendency level determination, (a program currently being viewed by the user), matches the user's recording tendency, so as to quantify the determination result.

Any determination algorithm may be used in the tendency level determination unit 304, and the present invention is not limited to any particular determination algorithm. Next, in step S404, the tendency level determination unit 304 outputs the determination result obtained in step S403 to the external device control unit 305.

The above is the control executed by the tendency level determination unit 304. However, the user may often changes channels to find a desired program like zapping, not intending to view a particular program. In this case, the user does not select a channel to view a particular program. Thus, it is inefficient to perform the tendency level determination processing upon each selection. Further, from the viewpoint of controlling an operating state level as described below, a control mode is changed in a short time, which is not efficient as well.

Therefore, in this exemplary embodiment, the determination unit executes the tendency level determination processing after determining that the user has not changed channels for a predetermined period or more. To be specific, if the user changes channels within a predetermined period, the program information management unit 301 performs control to stop outputting the program information to the tendency level determination unit 304.

Next, the control of the external device control unit 305 is described. The external device control unit 305 has a function of issuing a command to control the recording apparatus 122 based on the tendency level that is determined by the tendency level determination unit 304. To be specific, the external device control unit 305 sends a command via the external IF unit 108 to the recording apparatus 122 to control the operating state level of the recording apparatus 122.

Further, the external device control unit 305 receives an operation instruction for the recording apparatus 122 from the system control unit 106 according to the user's operations on the digital television 121, and executes control to issue a command corresponding to the operation instruction to the recording apparatus 122. Examples of the user's operation include a recording start operation, a programming operation, a recording cancel operation, a recording stop operation, and a play-back operation.

As described above, a warm-up time (period necessary to start recording) of the recording apparatus 122 varies depending on its operating state. Thus, in this exemplary embodiment, the tendency level determination unit 304 determines a probability that the user will record a program currently being broadcast, and the external device control unit 305 controls an operating state of the recording apparatus 122 based on the determination result.

Figure 5:
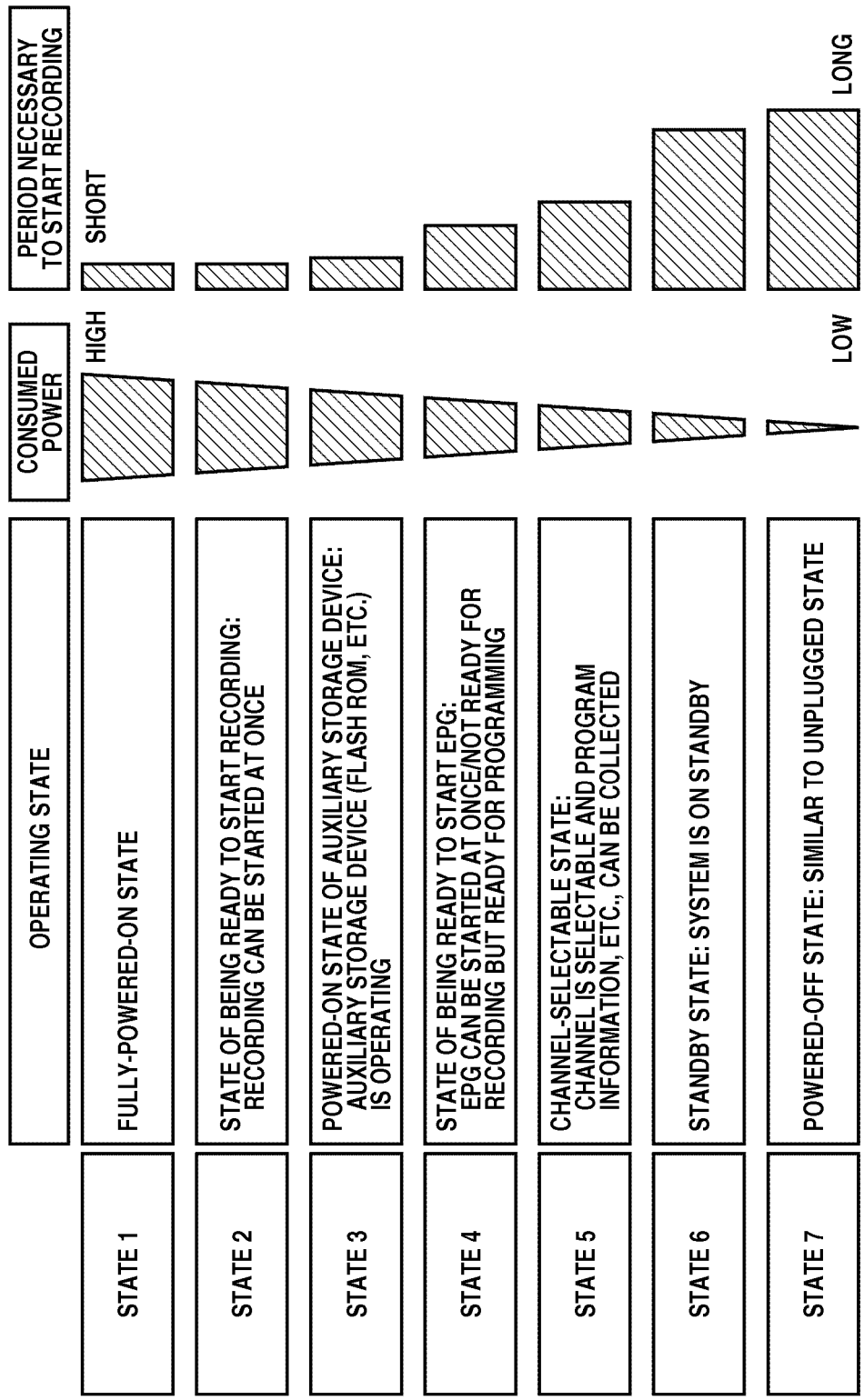
FIG. 5 is a conceptual view illustrating a relationship among an operating state of a recording apparatus, power consumption, and time necessary to start recording according to an exemplary embodiment of the present invention.

FIG. 5 is a conceptual view illustrating correlation between an operating state of the recording apparatus 122, power consumption under each operating state, and time necessary to start recording. States 1 to 7 correspond to operating state levels set by the recording apparatus 122. Detailed information about each operating state level is described in an operating state field of FIG. 5.

FIG. 5 illustrates power consumption of the recording apparatus 122 in each operating state level in association with the states 1 to 7. The state 7 involves the smallest power consumption, and the power consumption increases toward the state 1. For example, in the state 6, "standby state", in which power is supplied only to the required minimum components of the recording apparatus 122, power consumption is small. However, in the state 1, "fully-powered-on state", in which power is supplied to all components, power consumption is largest.

FIG. 5 also illustrates a period necessary to shift to a recordable state after receiving a recording instruction when a recording instruction is issued in each operating state level corresponding to the states 1 to 7. As illustrated in FIG. 5, in the state 7, "powered-off state", the apparatus requires the longest period to start recording. In the state 1, fully-powered-on state", the apparatus requires the shortest period to start recording.

For example, consider an operation of a user who records a program currently being broadcast. First, if the user performs a recording operation with the remote controller 105, data about the operation is input to the light receiving unit 104 and processed by the operation unit 109, the system control unit 106, the recording processing unit 107, and the external IF unit 108, and then a recording start command is issued to the recording apparatus 122. A period from when the system control unit 202 of the recording apparatus 122 receives the recording start command until when recording actually starts varies depending on an operating state of the recording apparatus 122, with the operating state being among the states 1 to 7. The period necessary to start recording is a period necessary to shift to a recordable state from the current state of the recording apparatus 122 when a recording operation is received.

In this exemplary embodiment, since the state 1 is a fully-powered-on state, and the state 2 is a state of being ready to start recording, a period necessary to start recording is shortest (recording can be started almost immediately). In the state 3, the flash ROM 206 serving as an auxiliary storage device is turned on. Thus, if a program is recorded on the flash ROM, a period necessary to start recording is a little longer than that of the state 1. In contrast, the state 7 is a fully-powered-off state, and a period necessary to start recording is longest.

The above description provides an example of a relationship between an operating state of the recording apparatus 122, power consumption under each operating state, and time necessary to start recording. However, the present invention does not require the seven operating states, (the states 1 to 7), as the possible operating states of the recording apparatus 122. According to the present invention, as long as a recording apparatus has two operating state levels, (for example, a power-on state and a power-off state), the recording apparatus can execute the following control of the external device control unit 305.

In the light of the above description, control of the external device control unit 305 is described with reference to a flowchart of FIG. 6 and a conceptual view of FIG. 7 which illustrates a relationship between an operating state of the recording apparatus 122 and a tendency level. FIG. 7 includes information about the tendency level in addition to the information of FIG. 5, and the power consumption and the requisite time are the same as (or alternatively similar to) those of FIG. 5. Further, the external device control unit 305 stores, in an arbitrary storage area, a relationship between each operating state level of the recording apparatus 122 and the recording tendency level of FIG. 7 as a setting table (setting information). For example, state 1 is associated with a recording tendency levels between 90 and 100 inclusive, and state 0 is associated with recording tendency levels between 0 and 29 inclusive. The full relationship between the operating states and the tendency levels in this embodiment of the present invention is shown in FIG. 7.

In this exemplary embodiment, the highest tendency level of the quantified tendency levels determined by the tendency level determination unit 304 is set to 100, and the lowest tendency level is set to 0. Further, a range of the tendency level is set in advance in association with each operating state of the recording apparatus 122. A user may manually set a range of numerical values of tendency levels corresponding to each operating state. Also, the external device control unit 305 may acquire information about each operating state level of the recording apparatus 122 to automatically set the range based on the acquired operating state.

Figure 6:
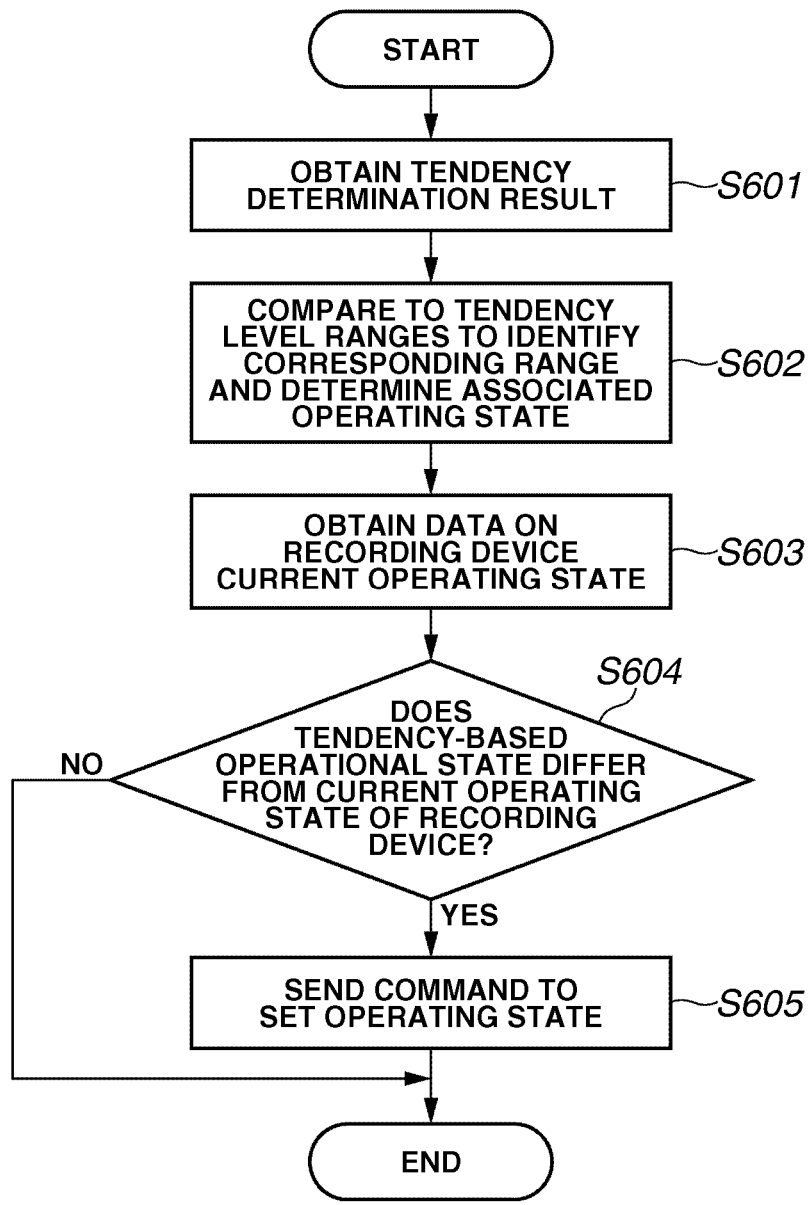
FIG. 6 is a flowchart of an operating state level control processing of a recording apparatus according to the first exemplary embodiment of the present invention.
Figure 7:
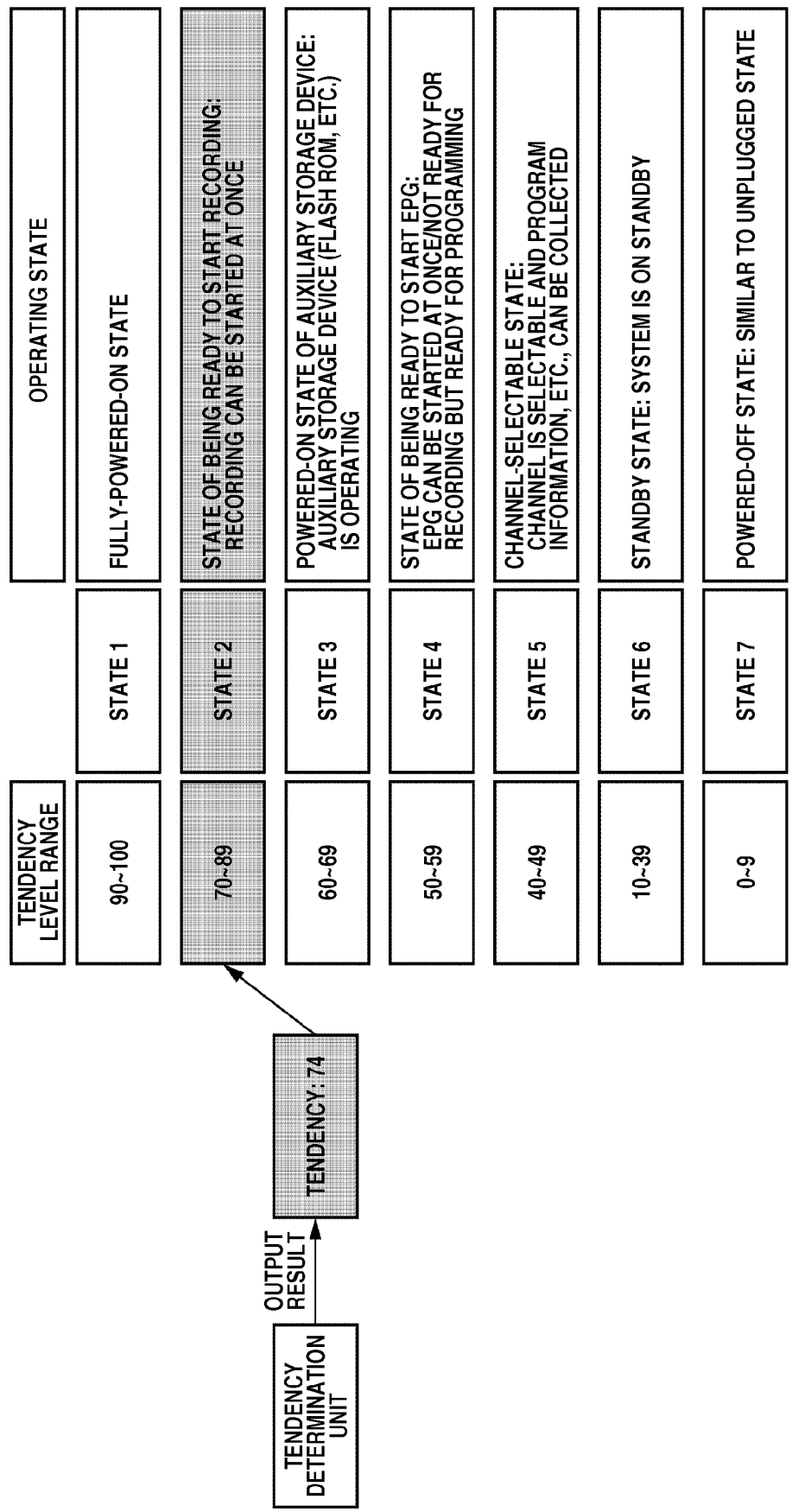
FIG. 7 is a conceptual view illustrating correlation between an operating state of a recording apparatus and a tendency level determination value according to an exemplary embodiment of the present invention.

First, in step S601 of FIG. 6, the external device control unit 305 accesses the tendency determination unit 304 to obtain a tendency level determination result (determination value) from the tendency level determination unit 304. For purposes of providing an example, the obtained tendency level determination value is assumed below to be 74, although any other value between 0 and 100 inclusive is also permissible in this embodiment of the present invention.

Next, in step S602, the external device control unit 305 compares a tendency level determination value obtained in step S601 with the tendency level ranges stored in the setting table to identify the corresponding tendency level range and thus determine the associated operating state for the recording apparatus 122. Thus, where the obtained tendency level determination value is 74 for example, the external device control unit 305 compares 74 with the tendency level ranges in the setting table, identifies the corresponding tendency level range 70 to 89, and thus determines that the associated operating state level for the recording apparatus 122 is state 2.

Subsequently, in step S603, the external device control unit 305 obtains information about a current operating state of the recording apparatus 122 from the recording apparatus 122 through the external IF unit 108. Next, in step S604, the external device control unit 305 compares an operating state level corresponding to the tendency level determination value determined in step S602 with a current operating state of the recording apparatus 122 in step S603.

If the external device control unit 305 determines that an operating state level corresponding to the tendency level determination value does not differ from the current operating state of the recording apparatus 122 (NO in step S604), the processing of FIG. 6 is terminated. Further, if the external device control unit 305 determines that an operating state level corresponding to the tendency level determination value differs from a current operating state of the recording apparatus 122 (YES in step S604), the processing proceeds to step S605.

In step S605, the external device control unit 305 issues a control command to set the operating state of the recording apparatus 122 through the external IF unit 108 to the recording apparatus 122. To be specific, the external device control unit 305 issues a command through the external IF unit 108 to set an operating state level to the operating state level determined in step 602 based on the tendency level determination value. In response to the received command, the system control unit 202 of the recording apparatus 122 controls the operating state of the recording apparatus 122 to match the state with the designated operating state level. The system control unit 202 functions as a unit for changing the operating state of the recording apparatus 122.

For example, if the current operating state level of the recording apparatus 122 is the state 4, and the obtained tendency level determination value is 74, the system control unit 202 of the recording apparatus 122 controls the recording apparatus 122 to change the operating state level of the recording apparatus 122 from the current state 4 to the state 2 corresponding to the tendency level determination value. As another example, if the current operating state level of the recording apparatus 122 is the state 1, and the obtained tendency level determination value is 74, the system control unit 202 of the recording apparatus 122 controls the recording apparatus 122 to change the operating state level of the recording apparatus 122 from the current state of 1 to the state 2.

The above is the description about the external device control unit 305 that controls the operating state based on an obtained tendency level determination value. The processing flow can be performed at the time of outputting program information about a program currently being broadcast from the program information management unit 301 to the tendency level determination unit 304.

In step S603, the external device control unit 305 obtains a current operating state level of the recording apparatus 122, but this processing alternatively may be performed before step S603. In the above processing flow, in step S604, it is determined whether to issue a command to specify an operating state, but this control can be omitted.

For example, the external device control unit 305 may alternatively issue a command to specify an operating state level based on a tendency level to the recording apparatus 122 even if the tendency-based operating state matches with the current operating state. The system control unit 202 of the recording apparatus 122 that receives the command can determine whether to change an operating state level by checking whether the operating state level matches its current operating state. In this case, it is unnecessary to obtain information about a current operating state level of the recording apparatus 122 in step S603, and processing flow proceeds from step S602 directly to step S605.

In this exemplary embodiment, the digital television 121 controls an operating state of the recording apparatus 122 based on a recording tendency level with respect to a program currently being viewed by a user. Therefore, available operating state levels of the recording apparatus 122 can be optimally controlled based on the user's recording tendency level.

As a result, a period necessary to start recording can be shortened as to a program of a high recording tendency level. Moreover, when a user desires to record a program currently being broadcast, the period necessary to start immediate recording can also be shortened. At the same time, if a user views a program of a low tendency level, an operating state level of the recording apparatus 122 can be changed to an operating state level that requires less power consumption, so that power consumed in a standby state of the recording apparatus 122 can be reduced. In particular, power consumption can be saved compared to a recording apparatus that is always on standby as described in the Related Art.

Second Exemplary Embodiment

Next, the digital television 121 according to a second exemplary embodiment of the present invention is described. In the above first exemplary embodiment, the determination unit determines a recording tendency level of a program currently being viewed by a user based on program information about the program. The determination unit also executes control over the operating state of the recording apparatus 122 based on the recording tendency level.

In contrast, in this exemplary embodiment, an operating state of the recording apparatus 122 is executed based on information about a picture quality and broadcasting time of a program currently being viewed by a user in addition to the above information. The picture quality information is information representing whether a picture quality of a program currently being viewed by a user is a high definition (HD) picture quality or a standard definition (SD) picture quality. Information about a picture quality of the program is included in the above program information. Further, the broadcasting time information represents a remaining time of a program currently being viewed by a user. The remaining time of the program can be calculated by subtracting the current time from the broadcast end time. The broadcast end time information is also included in the program information.

Figure 8:
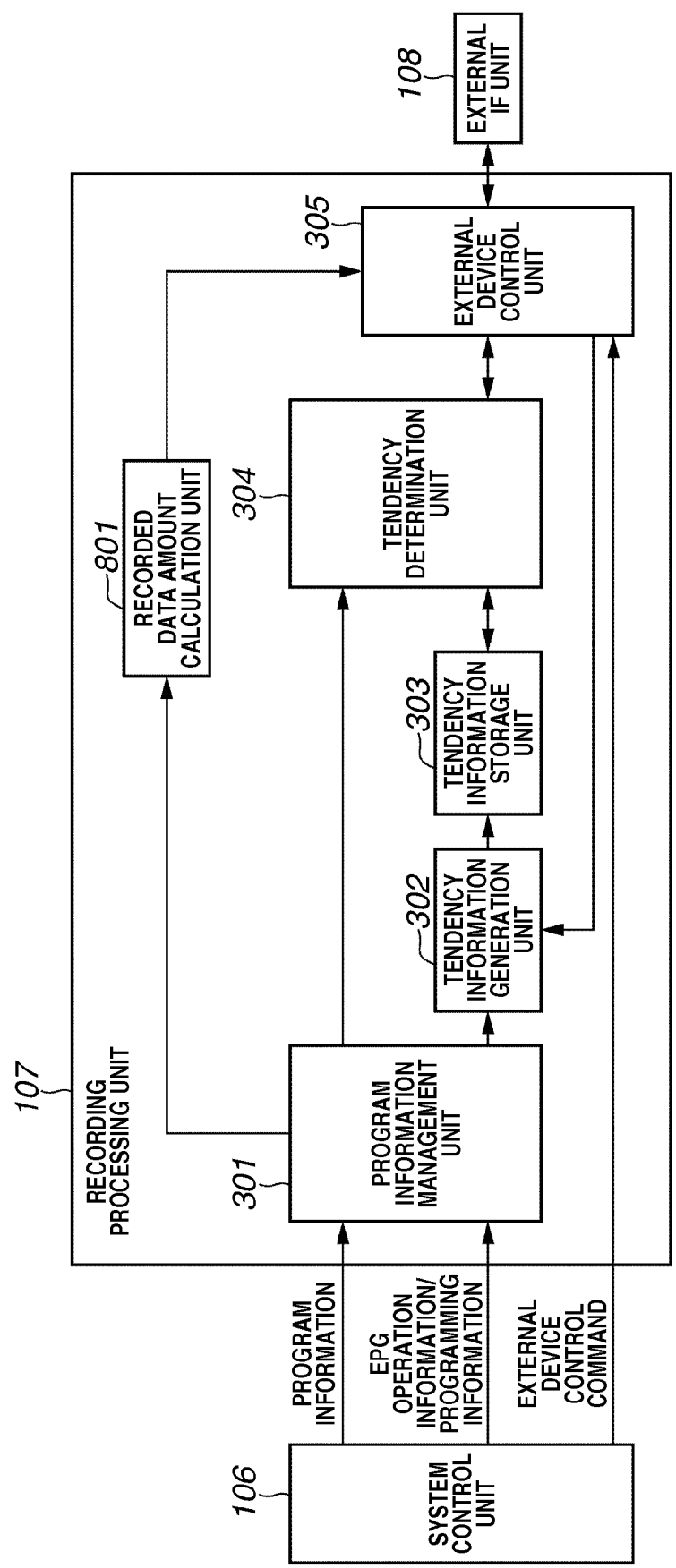
FIG. 8 is a system diagram of a recording processing unit according to a second exemplary embodiment of the present invention.

The configuration of the digital television 121 as a recording control apparatus and the configuration of the recording apparatus 122 as a recording apparatus are the same as FIGS. 1 and 2 except for the modification noted below. In this embodiment, the recording processing unit 107 of the digital television 121 of FIG. 3 is provided with a recorded data amount calculation unit 801 in addition to the components of FIG. 3. FIG. 8 illustrates the configuration of the recording processing unit 107 according to the present exemplary embodiment.

The recorded data amount calculation unit 801 is configured to receive data input from the program information management unit 301. Further, data output from the recorded data amount calculation unit 801 is input to the external device control unit 305. The recorded data amount calculation unit 801 receives information about picture quality and broadcasting end time of a program currently being viewed by a user from the program information management unit 301. These information are input from the program information management unit 301 at when the program information management unit 301 outputs program information to the tendency level determination unit 304. Further, the recorded data amount calculation unit 801 can receive information about a current time all the time.

When the picture quality information and the broadcasting end time information are received from the program information management unit 301, the recorded data amount calculation unit 801 calculates a remaining time of the program based on the current time and the broadcasting end time information. Moreover, the recorded data amount calculation unit 801 calculates a recorded data amount for the remainder of the program. The recorded data amount estimates an amount of recorded data that would be present in a recordation of the remainder of the program. This calculation is based on the remaining broadcasting time and the picture quality information. The recorded data amount varies depending on a recording picture quality of the recording apparatus 122 or an encoding method. According to the present exemplary embodiment, the recording picture quality and the encoding method are determined in advance. Further, the control unit can instruct the recording apparatus 122 to adopt a desired recording picture quality or encoding method.

The external device control unit 305 executes control over an operating state level of the recording apparatus 122 based on a tendency level determination value calculated by the tendency level determination unit 304 and a recorded data amount calculated by the recorded data amount calculation unit 801. A table of the relationship between each operating state level of the recording apparatus 122 and a tendency level, which is stored in the external device control unit 305, is the same as (or alternatively similar to) FIG. 7.

Referring next to FIG. 9, a processing flow of the external device control unit 305 is described. FIG. 9 illustrates a processing flow of the external device control unit 305. It is assumed here that either the HDD 204 or the flash ROM 206 of the recording apparatus 122 can record program video images.

First, in step S901, the external device control unit 305 obtains the tendency level determination value from the tendency level determination unit 304. This processing is the same as (or alternatively similar to) that in step S601 as described in the first exemplary embodiment.

Next, in step S902, the external device control unit 305 receives data on the recorded data amount of a program currently being broadcast, which is calculated by the recorded data amount calculation unit 801. The recorded data amount can be calculated in the above manner. Subsequently, in step S903, the external device control unit 305 obtains information about an operating state of the recording apparatus 122 and a recordable capacity of the HDD 204 and flash ROM 206 through the external IF unit 108.

Subsequently, in step S904, the external device control unit 305 compares the tendency level determination value obtained in step S901 with a tendency level range corresponding to the operating state level with reference to the table of relation between each operating state and each tendency level.

In step S905, the external device control unit 305 determines whether an operating state level corresponding to a tendency level determination value obtained through the comparison in step S904 is the state 2 or 3. The state 2 is a state of being ready for immediate recording on the HDD 204, and the state 3 is a state of being ready for immediate recording on the flash ROM 206. Thus, in step S905, it is determined whether the tendency level determination value is within such a range that enables immediate recording on the HDD 204 or the flash ROM 206. If the determination result is positive (YES in step S905), the processing advances to step S906. If the determination result is negative (NO in step S905), the processing advances to step S907.

In step S906, the external device control unit 305 compares a data amount calculated by the recorded data amount calculation unit 801 with a recordable capacity of the HDD 204 and flash ROM 206 calculated in step S903. Subsequently, in step S907, the external device control unit 305 determines an operating state level of the recording apparatus 122. The determination depends on whether the result was positive (YES) or negative (NO) in step S905. Until noted below, assume the result was positive (YES) in step S905. Even in the case of immediate recording of a program currently being viewed by a user, if it is determined that the recorded data amount is smaller than the recordable capacity of the flash ROM 206 in step S906, the external device control unit 305 records the data on the flash ROM 206. Because the flash ROM 206 is used instead of the HDD204, less power is needed, so the external device control unit 305 determines an appropriate operating state level for the recording apparatus 122 to be the state 3.

In contrast, in the case of immediate recording of a program currently being viewed by a user, if the recorded data amount is larger than a recordable capacity of the flash ROM 206 and smaller than a recordable capacity of the HDD 204, the data is recorded on the HDD 204. Because the HDD204 is used instead of the flash ROM 206, more power is needed, so the external device control unit 305 determines an appropriate operating state level for the recording apparatus 122 to be the state 2.

According to the present exemplary embodiment, it is presumed that a recordable capacity of the HDD 204 is larger than that of the flash ROM 206, but the present invention is not limited to that case. As described above, if the states 2 and 3 are compared, the state 3 is lower in power consumption than the state 2. According to the present invention, the operating state level of the recording apparatus 122 is controlled to minimize the power consumption. Thus, even if a recordable capacity of the HDD 204 is smaller than that of the flash ROM 206, when the data amount is smaller than a recordable capacity of the flash ROM 206, the external device control unit 305 determines an appropriate operating state level as 3.

Now assume the determination result is negative in step S905 (NO in step S905). An operating state level corresponding to a tendency level is neither the state 2 nor the state 3. Therefore, in step S907, an appropriate operating state level for the recording apparatus 122 is determined based on the tendency level in the same manner as (or alternatively a similar manner to) the method described above with respect to FIGS. 6 and 7 and the first exemplary embodiment. To give a conceivable example thereof, where the obtained tendency level determination value is 46 for example, the external device control unit 305 compares 46 with the tendency level ranges in the setting table, identifies the corresponding tendency level range 40 to 49, and thus determines that the associated operating state level for the recording apparatus 122 is state 5, and the appropriate operating state level is thus set to state 5.

Next, in step S908, the external device control unit 305 determines whether the appropriate operating state level determined in step S907 matches the current operating state level of the recording apparatus 122 obtained in step S903. The determination processing is the same as (or alternatively similar to) that in step S604 as described in the first exemplary embodiment.

As a result of the determination in step S908, if the current operating state level of the recording apparatus 122 differs from the appropriate operating state level determined in step S907 (YES in step S908), in step S909, the external device control unit 305 issues a command to the recording apparatus 122 to set the operating state level to the appropriate operating state level determined in step S907.

To be more specific, the external device control unit 305 issues a command to set the operating state level to be the appropriate operating state level determined in step S907 by the recording apparatus 122. In response to the command, the system control unit 202 of the recording apparatus 122 executes control to set an operating state of the recording apparatus 122 to the appropriate operating state level determined in step S907. Further, if the operating state level matches the operating state (NO in step S908), the processing of FIG. 9 is immediately terminated, as there is no need to change the operating state of the recording apparatus 122.

In steps S901 to S903, the external device control unit 305 obtains various types of information, however, the order of obtaining the information is not limited to the above. Similar to the first exemplary embodiment, the control unit performs control to determine whether to issue a command to specify an operating state, but the control can be omitted. The reason therefor is described in the first exemplary embodiment and thus not described here.

In this exemplary embodiment, the digital television 121 controls an operating state of the recording apparatus 122 based on a recording tendency level for a program currently being viewed by a user, information about picture quality and remaining broadcasting time of the program, and recordable capacities of plural storage units in the recording apparatus 122. Therefore, available operating state levels of the recording apparatus 122 can be controlled to be optimized based on the user's recording tendency level or the like.

As a result, a period necessary to start recording can be shortened as to a program of a high recording tendency level. Moreover, when a user desires to record a program currently being broadcast, the period necessary to start immediate recording can also be shortened. At the same time, if a user views a program of a low tendency level, an operating state level of the recording apparatus 122 can be changed to an operating state level that requires less power consumption, so that power consumed in a standby state of the recording apparatus 122 can be reduced. In particular, power consumption can be saved compared with a recording apparatus that is always on standby as described in the Related Art.

Further, even if the operating level is determined to be a tendency level that requires starting of the HDD 204, the control unit calculates a data amount in immediate recording of a program currently being viewed by a user so that a state of much less power consumption can be selected. If a plurality of storage units are provided, on a condition that the storage units have a capacity enough to record a program currently being viewed, the control unit sets an operating state level corresponding to an operating state that allows immediate recording with small power consumption. Accordingly, power consumption can be further reduced relative to the first exemplary embodiment.

In this exemplary embodiment, the processing of FIG. 9 is executed after a user has viewed a program for a predetermined period. However, the remaining broadcasting time changes over time. Accordingly, a recorded data amount calculated by the recorded data amount calculation unit 801 also changes. The operating state level might be shifted from the state 2 to the state 3 over time. Accordingly, the digital television 121 regularly performs processing carried out by the recorded data amount calculation unit 801 and the processing of FIG. 9. Hence, an operating state level can be controlled with higher accuracy.

Other Exemplary Embodiment

In the above first and second exemplary embodiments, a program currently being broadcast is controlled. However, the control unit may control an operating state level of the recording apparatus 122 based on a tendency level determination value of a program of the highest recording tendency level. In that case, program information regarding a plurality of programs that can be viewed by a user at that time as well as the program currently being viewed by the user is utilized. A recording tendency level can be determined based on not only a program currently being broadcast but also predetermined programs for which the present invention is suitable.

Further, the user is allowed to select a desired control mode of a program currently being broadcast as described in the first and second exemplary embodiments, the control mode for program information about all viewable programs at certain time, and a mode where any of the above modes is not executed.

Further, each exemplary embodiment can be implemented as software by a computer (or a central processing unit (CPU) or a microprocessor unit (MPU)) of a system or an apparatus.

Further, a computer program stored on a computer readable medium or supplied to such computer in order to implement the above exemplary embodiments also embodies the present invention. The scope of the present invention covers a computer program for implementing the functions of the above exemplary embodiments.

For example, a computer program for implementing the above exemplary embodiments may be executed in any form as long as the program is a computer-readable one. For example, the computer program may be object code, a program executed by an interpreter, or script data supplied to an operating system (OS). However, the invention is not limited to these forms. For example, a software or firmware implementation can be implemented on a microprocessor based platform dedicated to audio/video processing that may lack the full functionality of a general purpose computer.

The computer program for implementing the above exemplary embodiments may be supplied to a computer using a storage medium or by wired/wireless communication, for example. Examples of the storage medium for supplying the program include a magnetic storage medium such as a flexible disk, a hard disk or a magnetic tape, an optical/magneto-optical storage medium such as a magneto optical (MO) disk, a compact disc (CD), a digital versatile disc (DVD), and a nonvolatile semiconductor memory.

As an available method for supplying the computer program based on wired/wireless communication, a server on a computer network can be utilized to supply the program. In such embodiments, a data file (program file) that can serve as a computer program embodying the present invention can be stored on the server. The program file may be a file in executable form or may be a source code.

The program file can then be supplied to a client computer that accesses this server and the client computer downloads the program file. The program file can be divided into a plurality of segment files and the segment files can be distributed to different servers. Thus, a server device that supplies the program file for implementing the above exemplary embodiments to a client computer is also included in the scope of the present invention.

In another exemplary embodiment, a computer program for implementing one or more of the above exemplary embodiments is encrypted and stored on a storage medium. The storage medium is then distributed to users. Decryption key information is supplied to users who meet certain requirements to enable the decryption and installation of the computer program in the user computer. The decryption key information can be supplied, for example, by downloading from a homepage through the Internet. A wide variety of decryption methods may be used in accordance with the present invention. For example, a single key method can be used. As another example, a public key cryptographic method may be used in accordance with the present invention.

Furthermore, the computer program for implementing the above exemplary embodiments may utilize the functions of an operating system (OS) that is running on the computer. A part of the computer program for implementing the above exemplary embodiments may be configured by firmware such as an expansion board that is inserted into a computer. Alternatively, a CPU mounted on the expansion board may execute the computer program.

While the present invention has been described with reference to exemplary embodiments, the invention is not limited to the disclosed exemplary embodiments. The following claims are to be accorded the broadest interpretation. Furthermore, the claims encompass at least all modifications, equivalent structures, and functions of the subject matter disclosed herein.

This application claims priority from Japanese Patent Application No. 2007-068790 filed Mar. 16, 2007, which is hereby incorporated by reference herein in its entirety.

What is claimed is:

1. A recording control apparatus that controls a recording device that records image data of a program, wherein the recording device having a first recording standby state and a second recording standby state having larger power consumption than the first recording standby state, and required time from a point at which the recording device receives a recording instruction until recording of image data starts in the second recording standby state being shorter than the first recording standby state, the recording control apparatus comprising:

a receiving unit that receives image data of a program;

a determination unit that determines a recording tendency of the program being received by the receiving unit based on a title of the program being received by the receiving unit and a recording history of image data by the recording device; and a control unit configured to control the recording device based on the recording tendency determined by the determination unit, wherein the control unit sets the recording device to the first recording standby state in a case where the receiving unit has been receiving a program of low recording tendency, and sets the recording device to the second recording standby state in a case where the receiving unit has been receiving a program of high recording tendency.

2. The recording control apparatus according to claim 1, wherein the control unit acquires information indicating a recording standby state of the recording device in advance and stores the acquired information.

3. The recording control apparatus according to claim 2, further comprising:
a communication unit that communicates with the recording device,
wherein the control unit controls the communication unit to issue a command to set the recording standby state of the recording device to the recording device.

4. The recording control apparatus according to claim 1, wherein the determination unit determines the recording tendency of the program that is received by the receiving unit a predetermined period or more.

5. A method for controlling a recording control apparatus that controls a recording device that records image data of a program, wherein the recording device having a first recording standby state and a second recording standby state having larger power consumption than the first recording standby state, and required time from a point at which the recording device receives a recording instruction until recording of image data starts in the second recording standby state being shorter than the first recording standby state, the method comprising the steps of:
receiving image data of a program;
determining a recording tendency of the program being received based on a title of the program being received and a recording history of image data by the recording device; and
controlling the recording device based on the determined recording tendency,
wherein the controlling step sets the recording device to the first recording standby state in a case where the receiving step has been receiving a program of low recording tendency, and sets the recording device to the second recording standby state in a case where the receiving step has been receiving a program of high recording tendency.

6. The method for controlling a recording control apparatus according to claim 5, further comprising the step of:
acquiring information indicating a recording standby state of the recording device in advance and storing the acquired information.

7. The method for controlling a recording control apparatus according to claim 6, further comprising the step of:
communicating with the recording device,
wherein the communicating is controlled to issue a command to set the recording standby state of the recording device to the recording device.

8. The method for controlling a recording control apparatus according to claim 5, wherein, in a determining step, the recording tendency of the program that received a predetermined period or more.

9. An image processing apparatus comprising:
a receiving unit that receives image data of a program;
a control unit that sets recording standby modes of a recording device which records image data of a program in accordance with a title of the program being received by the receiving unit,
wherein the recording standby modes include a first recording standby mode and a second recording standby mode having larger power consumption than the first recording standby mode.

10. An apparatus according to claim 9, wherein required time from a point at which the recording device receives a recording instruction until recording of image data starts in the second recording standby mode is shorter than the first recording standby mode.

11. An apparatus according to claim 10, further comprising:
a communication unit that communicates with the recording device,
wherein the control unit controls the communication unit to output the recording instruction to the recording device, and the recording device records the image data of the program in accordance with the recording instruction output from the communication unit.

12. An apparatus according to claim 9, wherein if the title of the program being received by the receiving unit matches a predetermined condition, the control unit sets the recording standby mode to the second recording standby mode.

13. An image processing apparatus comprising:
a receiving unit that receives image data of a program;
a control unit that sets recording standby modes of a recording device which records image data of a program in accordance with a genre of the program being received by the receiving unit,
wherein the recording standby modes include a first recording standby mode and a second recording standby mode having larger power consumption than the first recording standby mode.

14. An apparatus according to claim 13, wherein required time from a point at which the recording device receives a recording instruction until recording of image data starts in the second recording standby mode is shorter than the first recording standby mode.

15. An apparatus according to claim 14, further comprising:
a communication unit that communicates with the recording device,
wherein the control unit controls the communication unit to output the recording instruction to the recording device, and the recording device records the image data of the program in accordance with the recording instruction output from the communication unit.

16. An apparatus according to claim 13, wherein if the genre of the program being received by the receiving unit matches a predetermined condition, the control unit sets the recording standby mode to the second recording standby mode.

17. A recording system comprising:
a receiving unit that receives image data of a program;
a recording device that records image data of a program;
a control unit that sets, in accordance with a title of the program being received by the receiving unit, recording standby modes in which the recording device waits for recording image data, wherein the recording standby modes include a first recording standby mode and a second recording standby mode having larger power consumption than the first recording standby mode.

18. A recording system comprising:
a receiving unit that receives image data of a program;
a recording device that records image data of a program;
a control unit that sets, in accordance with a genre of the program being received by the receiving unit, recording standby modes in which the recording device waits for recording image data,
wherein the recording standby modes include a first recording standby mode and a second recording standby mode having larger power consumption than the first recording standby mode.

19. A recording system comprising:
a receiving unit that receives image data of a program;
a recording device that records image data of a program, the recording device recording image data into one of a first recording medium and a second recording medium which has larger power consumption for recording than the first recording medium;
a control unit that sets, in accordance with a time length of the program being received by the receiving unit, recording standby modes in which the recording device waits for recording image data,
wherein the recording standby modes include a first recording standby mode in which the recording device waits for recording image data into the first recording medium and a second recording standby mode in which the recording device waits for recording image data into the second recording medium.

20. A system according to claim 19, wherein the second recording medium has larger recording capacity than the first recording medium.

21. A recording system comprising:
a receiving unit that receives image data of a program;
a recording device that records image data of a program;
a control unit that controls a plurality of operation modes,
wherein the plurality of operation modes includes a power-on mode, a power-off mode and a plurality of recording standby modes,
wherein the plurality of standby modes includes a first recording standby mode having lower power consumption than the power-on mode, a second recording standby mode having lower power consumption than the first recording standby mode, a third recording standby mode having lower power consumption than the second recording standby mode, and a fourth recording standby mode having lower power consumption than the third recording standby mode.

22. A system according to claim 21, wherein recording of image data is ready in the first recording standby mode, a flash memory operates in the second recording standby mode, an electronic program guide is ready in the third recording standby mode, and a channel is selectable in the fourth recording standby mode.

23. A method of controlling an image processing apparatus, the method comprising:
receiving image data of a program;
setting recording standby modes of a recording device which records image data of a program in accordance with a title of the program being received,
wherein the recording standby modes include a first recording standby mode and a second recording standby mode having larger power consumption than the first recording standby mode.

24. A method of controlling an image processing apparatus, the method comprising:
receiving image data of a program;
setting recording standby modes of a recording device which records image data of a program in accordance with a genre of the program being received,
wherein the recording standby modes include a first recording standby mode and a second recording standby mode having larger power consumption than the first recording standby mode.

* * * * *